G. FOSTER.
Harvesters.

No. 157,506. Patented Dec. 8, 1874.

WITNESSES:
A. W. Almquist
O. Sedgwick

INVENTOR:
G. Foster
BY
ATTORNEYS.

UNITED STATES PATENT OFFICE.

GEORGE FOSTER, OF CLARKSVILLE, NEBRASKA.

IMPROVEMENT IN HARVESTERS.

Specification forming part of Letters Patent No. 157,506, dated December 8, 1874; application filed May 23, 1874.

*To all whom it may concern:*

Figure 1:
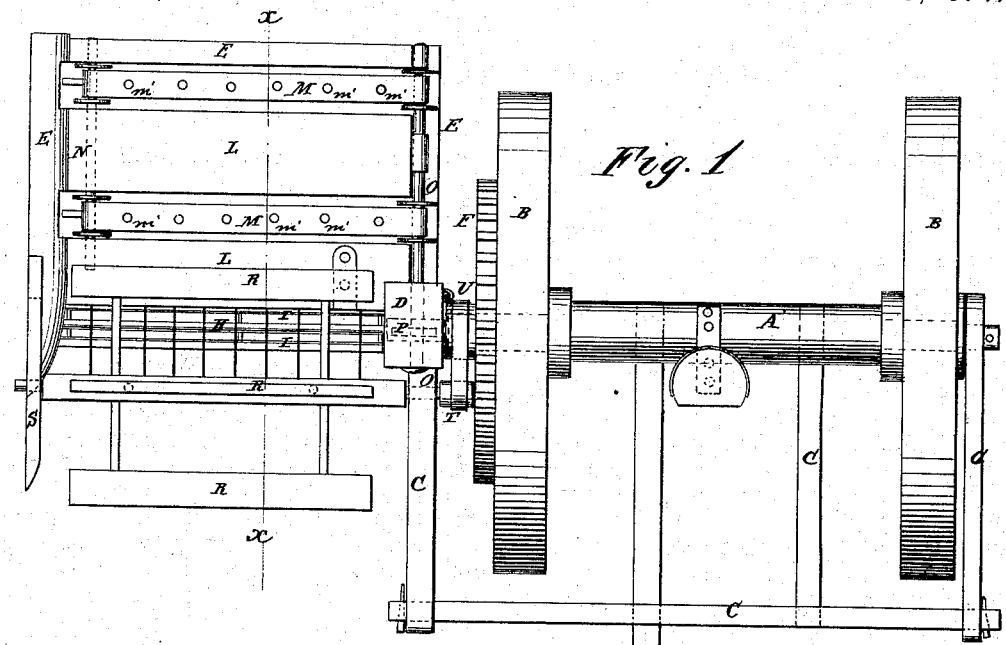
Figure 2:
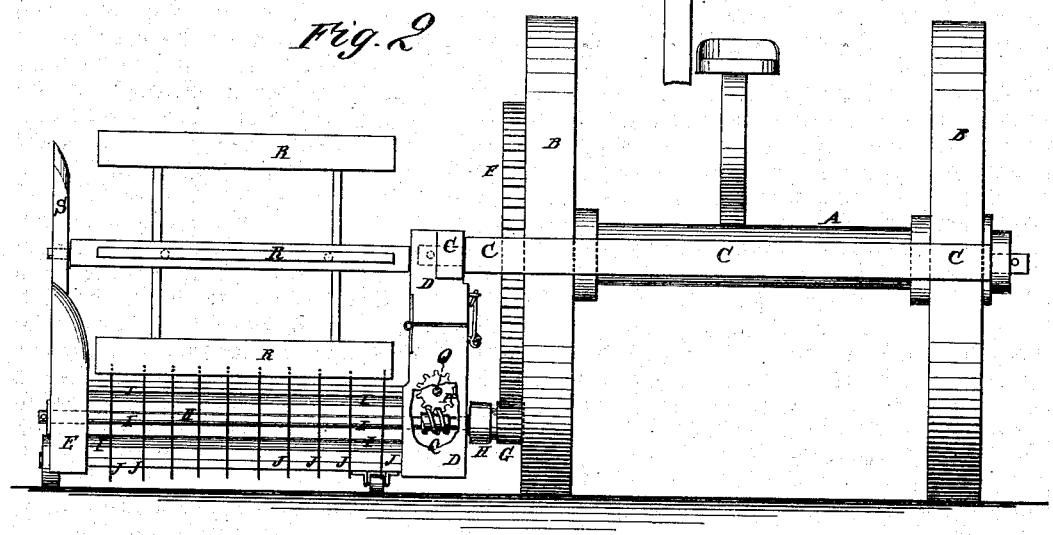
Figure 3:
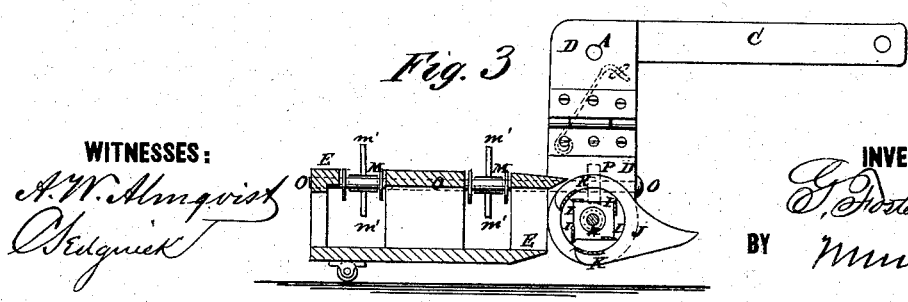

Be it known that I, GEORGE FOSTER, of Clarksville, in the county of Merrick and State of Nebraska, have invented a new and useful Improvement in Reapers and Mowers, of which the following is a specification:

Figure 1 is a top view of my improved machine. Fig. 2 is a front view of the same, part being broken away to show the construction. Fig. 3 is a detail section taken through the line $x\ x$, Fig. 1.

Similar letters of reference indicate corresponding parts.

My invention has for its object to furnish an improved machine for cutting grass and grain, which shall be simple in construction, convenient in use, and effective in operation, and which will deposit the grain and grass at the inner side of the platform in the rear of the drive-wheels, so as to be out of the way of the machine at its next round.

The invention will first be fully described, and subsequently pointed out in the claims.

A represents the axle, upon the journals of which the drive-wheels B revolve, and from which is suspended the frame-work C of the machine. To one side of the frame C is attached the upper end of a standard or upright frame, D, to the lower end of which is attached the platform-frame E. The upright D is made in two parts, hinged to each other, so that the platform may be raised into an upright position, for convenience in passing from place to place. To the outer side of the drive-wheel B is securely attached, or upon it is formed, a large gear-wheel, F, the teeth of which mesh into the teeth of a small gear-wheel, G, attached to the inner end of a shaft, H, which revolves in bearings in the forward parts of the platform-frame E. The shaft H is surrounded with a series of four, more or less, knives, I, the ends of which are bent inward, and are attached to the shaft H; or the ends of the said knives may be attached to collars formed upon or attached to said shaft, so that the said knives may be carried around by and with the said shaft. The ends of the knives I enter tubular recesses or sockets in the frame E, so that the stalks of grain or grass cannot pass beyond their ends. J are the fingers or guards, which are made narrow or thin, are placed close together, and have arms extending backward above and below the knives I. The ends of these arms of the guards J are attached to two bars or plates K, the ends of which are secured to the platform-frame E, the space between these bars in rear of the knives being left open. The lower side of the forward ends of the guards J are slightly rounded off or curved, so that they may readily pass over the ground, and pass beneath any lodged grass or grain, and raise it sufficiently to allow it to be cut by the knives I. L is the platform, in which are formed two or more slots, extending from side to side of said platform, to receive the endless bands M, which are provided with prongs $m'$, to take the cut grain as it falls upon the platform L, and discharge it at the inner side of the platform in the rear of the drive-wheel. The endless bands M pass around the shaft N, which revolves in bearings at the outer side of the platform L, and around the shaft O, which revolves in bearings at the inner side of said platform. The forward end of the shaft O passes through the standard or frame D, and has a screw-wheel, P, attached to it, the teeth of which mesh into the teeth or threads of the screw Q, formed upon the shaft H. R is the reel, the outer end of the shaft of which revolves in bearings in a post, S, attached to the outer part of the platform-frame E. The inner end of the shaft of the reel R revolves in bearings in the frame C, and to its projecting end is attached a pulley, T, around which passes a band, which also passes around a pulley, U, formed upon or attached to the hub of the drive-wheel B or gear-wheel F.

Having thus described my invention, what I claim as new, and desire to secure by Letters Patent, is—

1. The combination of the thin guard-fingers J, having pointed front ends and open rear ends, with the bars or plates K, and the revolving shaft H, and long cutters I, all constructed and relatively arranged as herein shown and described.

2. The combination of the endless bands M, provided with fingers $m'$, the shafts N O, the screw-wheel P, and the endless screw Q, with the slotted platform-frame E and the knife-shaft H, substantially as herein shown and described.

GEORGE FOSTER.

Witnesses:
J. STEADMAN,
W. R. MORSE.